United States Patent [19]

Osawa et al.

[11] Patent Number: 4,594,285

[45] Date of Patent: Jun. 10, 1986

[54] FLEXIBLE MEMBRANE MATERIAL

[75] Inventors: Yoshitaka Osawa; Akira Nishimura; Junki Morimi; Mitsunobu Tobe, all of Osaka, Japan

[73] Assignee: Sumitomo Electric Industries, Ltd., Osaka, Japan

[21] Appl. No.: 663,538

[22] Filed: Oct. 22, 1984

[30] Foreign Application Priority Data

Oct. 22, 1983 [JP] Japan ................................ 58-197938

[51] Int. Cl.4 ................................................ B32B 5/16
[52] U.S. Cl. ..................................... 428/240; 427/195;
428/284; 428/286; 428/287; 428/327; 428/336;
428/339; 428/340; 428/341
[58] Field of Search ............... 428/327, 240, 284, 286,
428/287, 336, 339, 340, 341; 210/500.2;
427/195

[56] References Cited

U.S. PATENT DOCUMENTS 4,346,139 8/1982 Osawa et al. ...................... 428/252

Primary Examiner—Theodore E. Pertilla
Attorney, Agent, or Firm—Sughrue, Mion, Zinn, Macpeak and Seas

[57] ABSTRACT

A flexible membrane material of good water repellency comprising a base material and a water repellent layer on the base material, wherein the water repellent layer is a thin rubber layer having therein finely divided fluorinated resin grains scattered and rubbed in. This water repellent layer is firmly adhered to the base material and is substantially free from development of cracks during use. Furthermore the water-repellent layer prevents permeation of water and formation of a water layer on the membrane material. The flexible membrane material of the invention is suitable for use in the production of a radome for a satellite communication system, pneumatic membrane structures, or tents.

14 Claims, 5 Drawing Figures

FLEXIBLE MEMBRANE MATERIAL

FIELD OF THE INVENTION

The present invention relates to a flexible membrane material and more particularly to a flexible membrane material having good water repellency, and a process for production thereof.

BACKGROUND OF THE INVENTION

Flexible membrane materials are commonly used in many products that are required to have water repellency. These are mainly products for outdoor use, including pneumatic membrane structures, tents, and radar domes. The membrane material for use in these products is usually composed of a fabric of any suitable fiber material as a reinforcing member, having a rubber or plastic coating layer provided on its surface. This coating material of rubber or plastic protects the fabric under various conditions and further functions to waterproof and air-proof the membrane material and to make it water repellent, so as to prevent it from absorbing water and from forming a water layer on its surface. If the water content of the membrane material increases and a water layer is formed on the surface, various problems arise. For example, in the case of the pneumatic membrane structures and tents, the weight of the membrane material increases, losing the advantage of light weight which is characteristic of membrane materials. In the case of the radar dome, wave transmittance will decrease.

In membrane material products especially required to have water repellency, therefore, it is known to employ press molding to make the surface of the membrane material very smooth. For products required to have a much higher water repellency, the surface of the membrane material must be extremely smooth even though it is composed of a material having a relatively high water repellency, and for this purpose it has been proposed to laminate a fluorinated resin film of high water repellency on the press-molded surface or provide a layer of the fluorinated resin on the press-molded surface as described in, for example, U.S. Pat. No. 4,346,139. It has also been proposed to use a fluorinated resin for the entire coating layer. However, these conventional membrane materials have certain disadvantages.

The fluorinated resin used has poor adhesive properties, and consequently it is difficult to form a composite structure in which a fluorinated resin film will not easily peel off. Even if a uniform layer or film of the fluorinated resin is provided, when the membrane material is bent, cracks or wrinkles will develop because of the characteristic low elongation and high modulus of such films.

Since a relatively large amount of expensive fluorinated resin must be used, production costs are high. Such membrane materials have poor workability, and it is difficult to produce a membrane material of large area and length by press molding. A high temperature furnace is needed for high-temperature processing fluorinated resin at temperatures of 300° C. or higher. Because of this high temperature processing, the fabric material that is used must be limited, and fabrics made of organic fibers cannot be used.

SUMMARY OF THE INVENTION

An object of the invention is to provide a flexible membrane material having excellent water repellency and simplified construction.

Another object of the invention is to provide a flexible membrane material having improved adhesion, excellent workability, a high elongation and a low modulus.

Another object of the invention is to provide a process for manufacturing a flexible membrane material at a reduced cost and by a simplified manufacturing procedure.

It has been found that these and other object of the present invention are accomplished by a flexible membrane material comprising:

a base material and a water repellent layer on the base material, wherein the water repellent layer is a thin rubber layer having a uniform dispersion of finely divided particles of a fluorinated resin in at least a portion thereof.

DETAILED DESCRIPTION OF THE INVENTION

The present invention will hereinafter be explained in detail with reference to the accompanying drawings.

Figure 1:
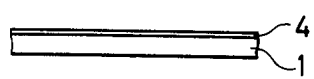
FIG. 1 is a schematic cross sectional view of a membrane material of the present invention.
Figure 2:
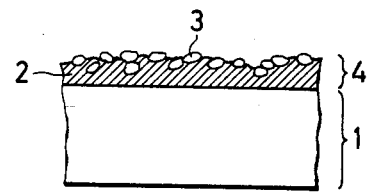
FIG. 2 is an enlarged view of FIG. 1.

FIGS. 1 and 2 show a membrane material of the present invention, comprising a base material 1 and a water repellent layer 4 on the base material 1. This water repellent layer 4 is a rubber supporting layer 2 having finely divided fluorinated resin grains 3 embedded therein. Water repellent layer 4 is produced by scattering the fluorinated resin grains 3, which are in the form of a finely divided powder on the rubber layer 2 and then rubbing them in the rubber layer 2 to form a coating of closely-aligned resin grains at or near the surface of rubber layer 2. It is necessary for the fluorinated resin grains 3 to be applied to the rubber layer 2 after its application to base material 1 but prior to its vulcanization and curing. This is one of the features of the present invention.

In producing water repellent layer 4, the finely divided fluorinated resin grains 3 are not applied as a dispersion along with rubber layer 2. If the grains are first dispersed in the rubber and applied along with the rubber layer, advantages of the present invention are not obtained, and adhesion between water repellent layer 4 and base material 1 is poor and blistering may occur between the water repellent layer 4 and the base material 1. This is due to the fact that the contact area between the base material 1 and the finely divided fluorinated resin grains 3 increase.

Also, in contrast to the present invention, in which the rubber can be freely selected, the type and amount of rubber which can be used are limited to those compatible with the fluorinated resin. For example, if a polytetrafluoroethylene powder and an ethylene/propylene rubber are mixed in a volume ratio of 50:50 to form a dispersion, phase separation will occur, producing an unsuitable water-repellent coating layer irregular in thickness.

Although the phase separation problem may be overcome by changing the volume ratio, this reduces in water repellency.

In addition, because the fluorinated resin grains are not concentrated near the surface of layer 2, but instead are uniformly dispersed throughout the rubber layer, the thickness of the coating layer, and consequently the amount of the fluorinated resin increases.

In the membrane material of the present invention, fluorinated resin grains which are applied to rubber layer 2 as a finely-divided powder are used so that significant cracks will not develop even when the membrane material is bent. The resin powder is applied so as to obtain small clearances between the finely divided grains in the resulting coating and because of the dense dispersion of resin particles, water is prevented from passing through the membrane material or from attaching thereto.

The material selected for the base material in the present invention is not unduly limited, and may be freely selected from any flexible film-shaped material to which rubber will adhere, including a fabric formed from organic or inorganic fibers, a rubber sheet, a plastic sheet, and a rubber or plastic-coated cloth. When the surface of the base material is made of rubber, the rubber surface layer can be utilized as a supporting layer by applying the resin grains and rubbing them into the rubber layer prior to its vulcanization and curing.

Various rubbers such as natural rubber and synthetic rubbers can be used for the rubber supporting layer. Examples of the synthetic rubbers include isoprene rubber, butadiene rubber, styrene-butadiene rubber acrylonitrile-butadiene rubber, chloroprene rubber, butyl rubber, chlorosulfonated polyethylene rubber, urethane rubber, acrylate rubber, polysulfated rubber, silicone rubber, fluorinated rubber, epichlorohydrin rubber and ethylene-acrylate rubber.

Generally, the rubber supporting layer has a thickness of about 1 to about 100$\mu$, preferably 5 to 50$\mu$ and most preferably 10 to 30$\mu$. It can be prepared by coating a solution of rubber composition in a suitable solvent such as a mixture of toluene and gasolene on a base material in a conventional manner such as brushing, spreading, doctor knife-coating, roll-coating, etc.

The fluorinated resin which can be used in the present invention preferably has an average particle diameter of about 0.01 to about 100$\mu$ preferably has an average particle diameter of 5 to 50$\mu$, and most preferably has an average particle diameter of 10 to 30$\mu$.

The fluorinated resin particles can be applied to the rubber layer in an amount of from about 0.01 to about 1,000 g/m$^2$ and preferably 5 to 10 g/m$^2$.

Examples of the fluorinated resin include polychlorotrifluoroethylene, polyvinylidene fluoride, tetrafluoroethylene-ethylene copolymers, trifluoromonochloroethylene-ethylene copolymers, polytetrafluoroethylene, tetrafluoroethylene-hexafluoropropylene copolymers, and tetrafluoroethylene-perfluoroalkyl vinyl ether copolymers.

Water repellency is an important characteristic of membrane materials. For example, when an antenna transmitting or receiving electromagnetic waves is covered with a radome, during rain, a water layer is usually formed on the external surface of the radome. This water layer absorbs the electromagnetic radiation and the wave transmittance of the radome as a whole decreases. The energy of the electromagnetic radiation thus absorbed produces noise in the antenna system, reducing its performance.

It is therefore desirable to prevent as much as possible a water layer from forming on the surface of a radome, particularly in a system in which communication is performed with weak signals, such as a satellite communication system. The water repellent membrane material of the present invention is believed to be particularly suitable for use in the production of a radome for satellite communication antennas.

Membrane materials according to the invention have many surprising advantages, including superior durability, improved flexibility and reduced cost.

Since the fluorinated resin grains are applied to and rubbed into the rubber layer, they are not required to adhere directly to the supporting layer, but instead are fixed in the rubber layer by a mechanical anchoring effect. Because of the superior anchoring properties of the rubber layer, the water repellent layer does not easily peel apart from the supporting layer.

Furthermore, the fluorinated resin is not used in the form of a continuously-formed member such as a film or a coating but instead is provided as finely divided fluorinated resin grains. When these grains are fixed in the surface of the membrane material of the present invention, a discontinuous fluorinated resin layer is formed on or near the surface of the membrane which does not form the large cracks which are typical of continuous fluorinated resin laminates. For this reason, the membrane material of the present invention is superior in flexural properties and causes no significant problems in practical use.

Rubbers which are not compatible with the fluorinated resin can be used since a rubber/fluorinated resin mixture is not used in the present invention, and consequently the supporting layer is not limited in the type and amount of the rubber to be used therein.

Since the fluorinated resin is used in the form of finely divided grains and provided only in the uppermost layer of the supporting layer, the amount of the fluorinated resin, which is expensive, can be reduced. Thus the membrane material of the present invention can be produced at low cost.

The membrane material of the present invention can be produced continuously by the steps of: applying a rubber coating to the supporting layer; drying; applying and rubbing in of the powder; and drying. The fluorinated resin grains do not require high-temperature treatment after coating, with the result that the selection of fabric materials is expanded and production of membrane materials having a large area is greatly simplified and reduced in cost.

The present invention is explained in greater detail by reference to the following example, but the present invention should not be construed as limited thereto.

EXAMPLE

Figure 3:
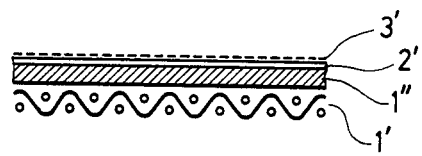
FIG. 3 is a cross sectional view of another embodiment of the present invention.

A rubber-coated cloth (Sample A) as shown in FIG. 3 was prepared as follows:
(1) One side of a 0.5 mm thick polyester fabric 1' was coated with an ethylene/propylene rubber layer 1" in a thickness of 0.3 mm by calendar rolling.
(2) An ethylene/propylene rubber paste (100 g of the rubber dissolved in a mixture of 180 g of toluene and 160 g of gasolene) was coated on the above-prepared rubber layer 1" in a thickness of 10$\mu$ to form a coating layer 2'. The layer was dried at room temperature for 5 minutes and then at 80° C. for 30 minutes.

(3) A polytetrafluoroethylene powder 3' having an average particle diameter of 0.3μ was uniformly applied on to the coating layer 2' in an amount of 10 g/m² and pressed by a rubber roll to rub the powder in the coating layer 2'. Excess powder (2 g/m²) was recovered. Thus, 8 g/m² of the powder was fixed in the surface of the rubber layer.

(4) The coating layer 2' was vulcanized at 145° C. for 3 hours.

A comparative rubber-coated cloth (Sample B) was prepared in the same manner as above except that the steps (2) and (3) were omitted; that is, Sample B did not have a water repellent layer according to the invention.

Figure 4A:
FIGS. 4(a) and 4(b) are schematic cross sectional views of the membrane material of FIG. 3.
Figure 4B:
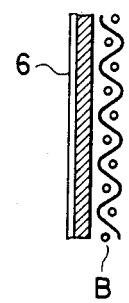

Water was applied on to Samples A and B. The conditions of Samples A and B are schematically shown in FIGS. 4(a) and 4(b), respectively, wherein reference numerals 5 and 6 indicate water droplets and a water layer, respectively. The angle of contact of the droplets on each of Samples A and B was determined using a goniometer. The results obtained are as follows.

|  | Sample A | Sample B |
| --- | --- | --- |
| Angle of Contact | 114° | 102° |

A clear difference in water repellency between Samples A and B was observed, with Sample A providing superior water repellency as shown in the formation of water droplets.

Then, Samples A and B were bent and crumpled. The water repellency of Sample A was not reduced.

While the invention has been described in detail and with reference to specific embodiment thereof, it will be apparent to one skilled in the art that various changes and modifications can be made therein without departing from the spirit and scope thereof.

What is claimed is:

1. A flexible membrane material comprising
a flexible base material and
a water repellent layer on the base material, wherein the water repellent layer is a rubber layer comprising a substantially uniform dispersion of finely-divided particles of a fluorinated resin in at least a portion thereof, the fluorinated resin being a fluorocarbon polymer.

2. The material as claimed in claim 1, wherein the base material is a rubber-coated fabric.

3. The material as claimed in claim 1, which is used for a radar dome.

4. The flexible membrane material as claimed in claim 1, wherein said dispersion of finely-divided fluorinated resin particles is provided adjacent to the surface of water repellent layer.

5. The flexible membrane material as claimed in claim 1, wherein said fluorinated resin is a perfluorinated resin.

6. The flexible membrane material as claimed in claim 1, wherein said fluorinated resin is selected from the group consisting of polychlorotrifluoroethylene, polyvinyl fluoride, tetrafluoroethylene-ethylene coolymers, trifluoromonochloroethylene-ethylene copolymers, polytetrafluoroethylene, tetrafluoroethylene-hexafluoropropylene copolymers, and tetrafluoroethylene-perfluroalkyl vinyl ether copolymers.

7. The flexible membrane material as claimed in claim 1, wherein said finely-divided particles have a mean average diameter of about 0.01 to about 100μ.

8. The flexible membrane material as claimed in claim 7, wherein said finely-divided particles have an average particle diameter of 5 to 50μ.

9. The flexible membrane material as claimed in claim 8, wherein said finely-divided particles have an average particle diameter of 10 to 30μ.

10. The flexible membrane material as claimed in claim 1, wherein said rubber layer comprises a rubber selected from the group consisting of natural rubber, isoprene rubber, butadiene rubber, styrene-butadiene rubber, acrylonitrile-butadiene rubber, chloroprene rubber, butyl rubber, chlorosulfonated polyethylene rubber, urethane rubber, acrylate rubber, polysulfated rubber, silicone rubber fluorinated rubber, epichlorohydrin rubber and ethylene-acrylate rubber.

11. The flexible membrane materials as claimed in claim 1, wherein said fluorinated resin particles are applied to said rubber layer in an amount of from about 0.01 to about 1,000 g/m².

12. The flexible membrane material as claimed in claim 11, wherein said fluorinated resin particles are applied to said rubber layer in an amount of from 5 to 10 g/m².

13. The flexible membrane material as claimed in claim 1, wherein the base material is a material to which rubber will adhere.

14. The flexible membrane material as claimed in claim 1, wherein the base material is selected from a fabric formed from organic or inorganic fibers, a rubber sheet, a plastic sheet, and a rubber or plastic-coated cloth.

* * * * *